INVENTORS
RALPH F. COOPER
BY OTTO E. HERMANNS
Joseph Januszkiewicz
ATTY.

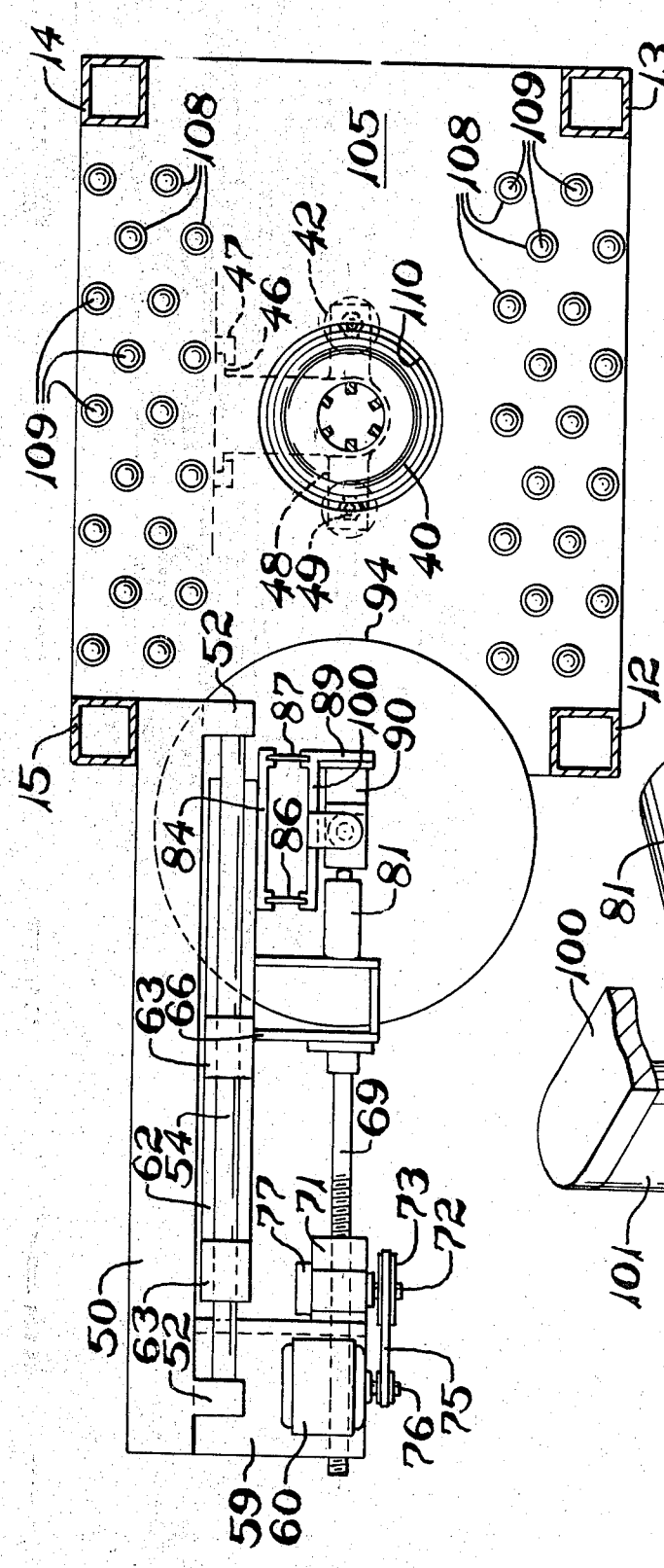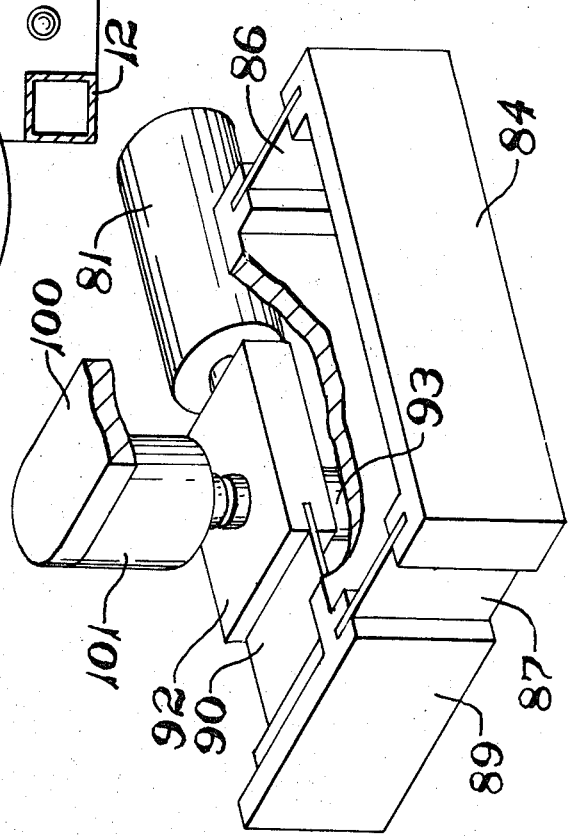

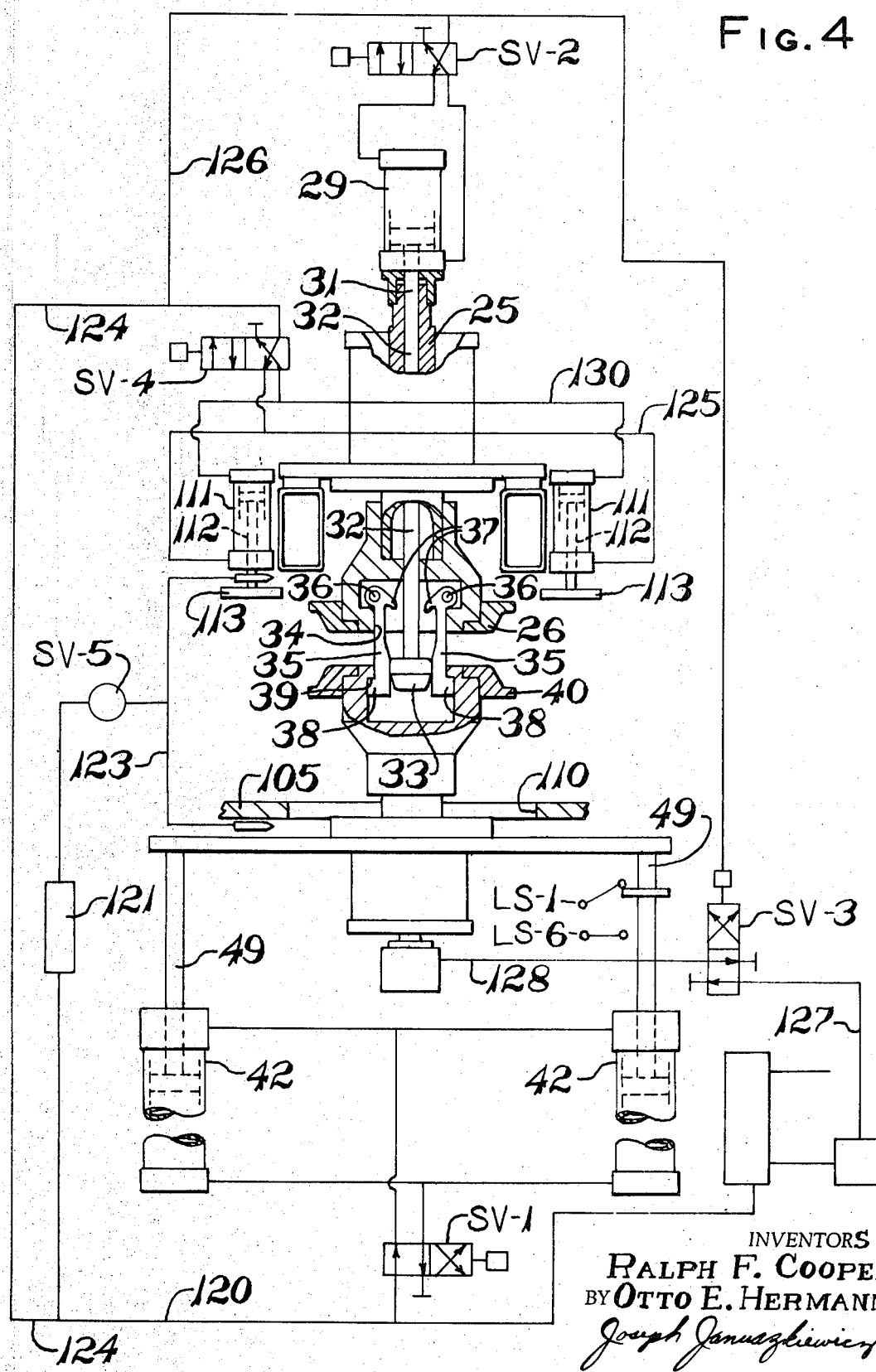

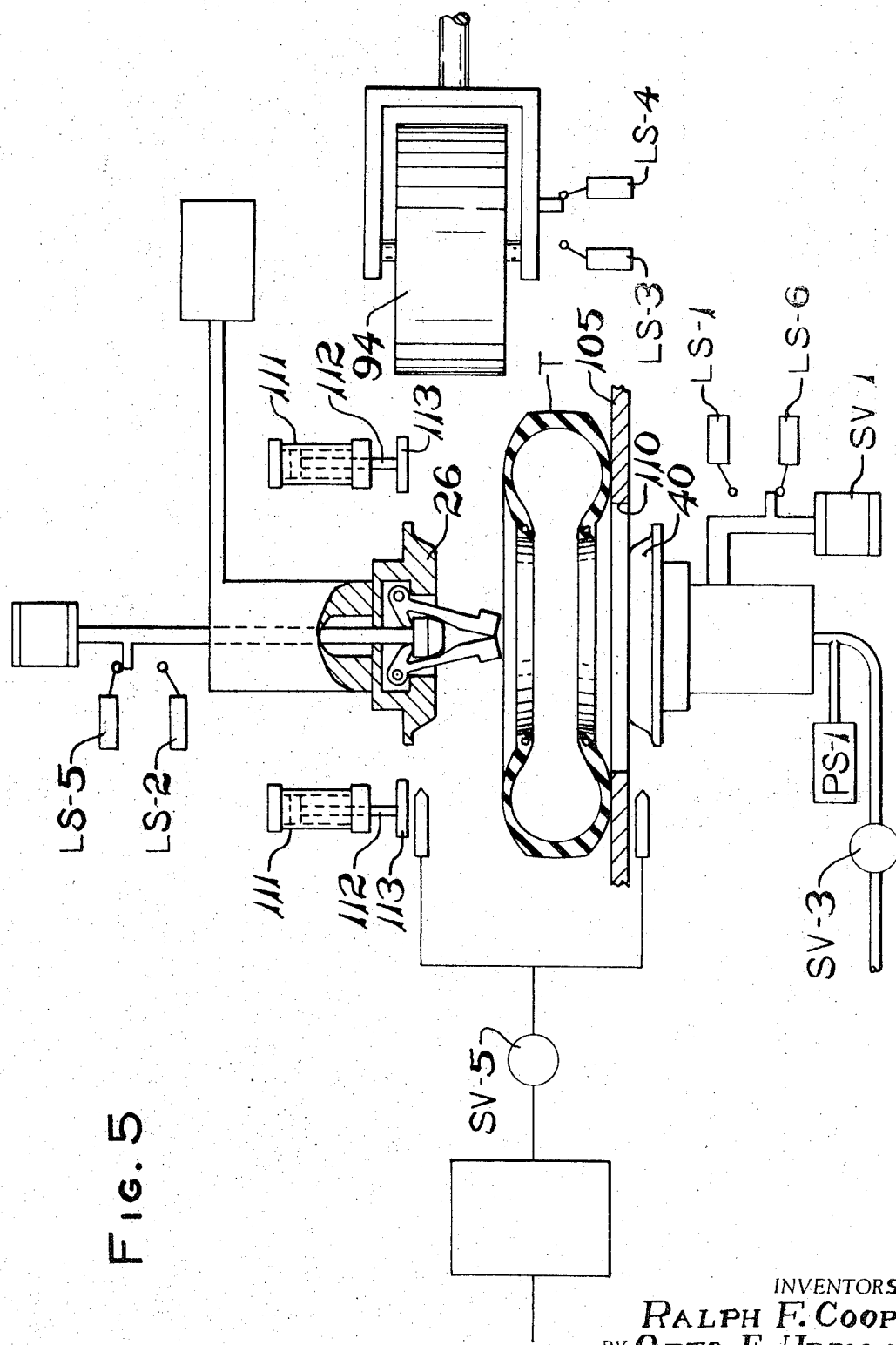

United States Patent Office 3,552,200
Patented Jan. 5, 1971

3,552,200
TIRE UNIFORMITY MACHINE
Otto E. Hermanns and Ralph F. Cooper, Akron, Ohio, assignors to The B. F. Goodrich Company, New York, N.Y., a corporation of New York
Filed Feb. 16, 1966, Ser. No. 527,854
Int. Cl. G01m 17/02
U.S. Cl. 73—146                                                       13 Claims

ABSTRACT OF THE DISCLOSURE

A tire uniformity testing machine has a pair of spaced flanges which support a pneumatic tire in cooperation with a movable load wheel which is moved toward and away from the tire to maintain a preset load on the tire. A sensing means mounted on the load wheel of the carriage which supports the load wheel measures lateral and radial force variations due to tire non-uniformity construction as the tire is rotated.

---

This invention relates to a tire machine and more particularly to an apparatus for measuring non-uniformity in a tire.

In the construction of tires, a green tire carcass is built up by a series of bias cut fabric plies being applied onto a cylindrical drum with the edges of such plies overlapping the drum to facilitate the wrapping of such overlap around a preformed bead ring. Sidewall strips, overhead and tread are wrapped around such cylindrical carcass prior to shaping and curing. There are many variants in the construction of tires which cause unevenness in the deposit of material or the uneveness in the accumulation of material onto a tire carcass as in butt splicing, turning operation, uneven tensioning or distortion of materials. Additional problems causing non-uniformity in the finished product include uneven stitching on a curved surface, and the non-uniform distribution of splices around a tire carcass. Additional factors may be in variation in cord physical characteristics from yard to yard, or from cord to cord as well as variation in cord count.

Devices employed to measure such non-uniformity have been generally directed to tire thump measuring apparatus; however, it is desirable to go further than this and to measure the constructional features as a finished product. Various proposals included the employment of a microphone pick-up and sound analyzer, a device to measure sidewall thickness or deflection. Although the balancing of a tire statically or dynamically improves performance to a degree, such action fails to appreciate the basic problem of selecting acceptable tires which will perform satisfactorily under all conditions, and rejecting those tires because of non-uniform construction.

The present invention contemplates the novel construction of a movable load wheel which maintains a preset load on a rotative tire held between laterally movable flanges which detects radial and lateral variations in force on such load wheel.

An object of the present invention is to provide a novel apparatus which can test tire non-uniformity quickly and efficiently.

A further object of this invention is to provide an apparatus which measures tire non-uniformity by maintaining a preset load on the tire to detect variations in construction of the tire.

Another object of this invention is to provide a novel apparatus which facilitates the testing of radial and lateral variations in forces on a tire.

These and other objects of this invention will become more apparent upon consideration of the following detailed descriptions of a preferred embodiment thereof, when taken in conjunction with the following drawings in which:

FIG. 2 is a plan view of the apparatus shown in FIG. 1 with a portion broken away.

FIG. 3 is an isometric view of the mounting means for the flex plates and brackets which support one end of the load wheel along with the load cells; however, showing such element in reverse as they appear in plan view in FIG. 2.

FIG. 4 is a schematic view of the tire testing apparatus showing the hydraulic control system for such apparatus.

FIG. 5 is a schematic showing of the control system for the tire testing apparatus showing the various limit switches and related components.

Figure 1:
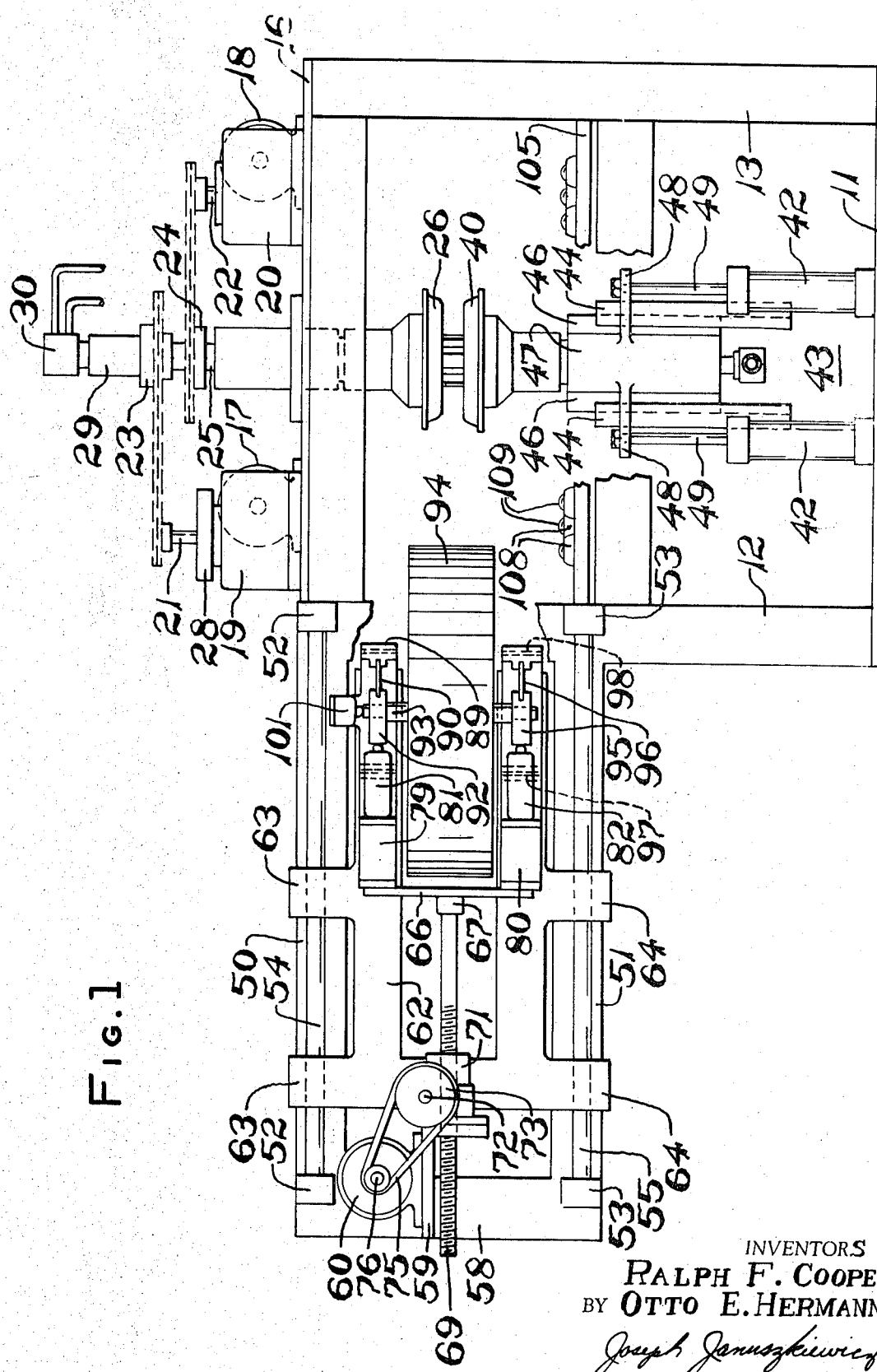
FIG. 1 is a side elevational view of the tire testing apparatus in accordance with the invention.

The apparatus shown in FIG. 1 comprises a base 11 supporting vertically spaced columns 12, 13, 14 and 15 with suitable cross braces and an upper plate 16. Plate 16 supports a pair of spaced motors 17 and 18 which through transmissions 19 and 20 drive output shafts 21 and 22, respectively. Output shafts 21 and 22 drive via sprockets 23 and 24 a hollow main drive spindle 25 and the rim flange 26 attached thereto. The drive from motor 17 to output shaft 21 is through a clutch 28 which permits selectively driving the main spindle 25 either through motor 18 or 17. Another clutch may be provided for transmission 20.

A pneumatic cylinder 29 mounted above sprockets 23 and 24 is attached to a rotary union 30 which supplies pressurized air from a suitable source to its double-acting piston which is connected via downwardly extending piston rod 31 to a coaxially extending rod 32 (FIG. 4) which has a wedge-shaped cam 33 secured to its lower end portion. FIG. 4 shows cylinder 29 in schematic form without the rotary union 30 to simplify the flow diagram. Rim flange 26 has an enlarged central opening 34 through which a plurality of latches 35 depend. The upper end portion of the respective latches 35 are pivotally mounted to the interior of the housing adjacent the rim flange 26 as at 36. Each of the latches 35 has a radially inwardly extending projection 37 closely adjacent the pivot means which cooperates with the wedge-shaped cam 33 upon upward movement of the rod 32 to pivot the latches 35 radially toward each other as viewed in FIG. 4 to permit the retraction of the latches 35 within the opening of the rim flange 26. The lower end portion of the respective latches 35 have laterally extending projections 38 which cooperate with a recessed annular shoulder 39 on a lower rim flange 40. The upper rim flange 26 is fixed in its location whereas lower rim flange 40 is movable upwardly and downwardly by pneumatic cylinders 42. Mounted upon the base 11 is an upwardly extending support frame 43 which has a pair of spaced guideways 44 which are slidably engaged by guides 46 of a vertically reciprocable carriage 47. Carriage 47 has a plurality of circumferentially spaced laterally extending braces 48 which are suitably connected to piston rods 49 of pneumatic cylinders 42. Pressurization of the head end of pneumatic cylinder 42 moves the carriage 47 along with rim flange 40 upwardly to the position shown in FIG. 1 whereas pressurization of the rod end of pneumatic cylinders 42 moves the carriage 47 along with rim flange 40 downwardly relative to the upper rim flange 26 to permit loading and unloading of a tire from the test apparatus. Secured to the column 15 are a pair of longitudinally extending square shaped tubular supports 50 and 51. Supports 50 and 51 have a pair of spaced brackets 52 and 53, respectively, which journal guide rods 54 and 55. The remote end portions of the respective rearwardly extending supports 50 and 51 have a cross brace 58 which connects the respective support members 50 and 51. Extending laterally from the cross brace 58 is a plate 59 on which is mounted a drive motor 60 for a purpose to be described. A carriage 62 having a pair of upper bearing blocks 63 and a pair of lower bearing blocks 64 slidably engage guide rods 54 and 55, respectively, which guide the longitudinal reciprocal movement of the carriage 62 on such guide rods. Carriage 62 has a laterally extending plate 66 to which is secured a boss 67 which has secured to it one end of a lead screw 69. Lead screw 69 extends through a rotatable nut, not shown, journaled in housing 71 which nut is driven by a shaft 72 which is connected via sleeve 73, belt 75 to the output shaft 76 of motor 60. The one end portion of shaft 72 is secured to an electromagnetic brake means 77 (FIG. 2) which locks the rotation of the rotatable nut and the lead screw 69 which in turn secures carriage 62 in a preset position relative to the rim flanges 26 and 40. Mounted on the upper and lower end portions of plate 66 are brackets 79 and 80 which support load sensing devices 81 and 82, which generate a signal proportional to the amount of deflection of the flex plates to be described, which signal is recorded by a moving needle on a chart to facilitate reading. Such load sensing devices are commercially available items and are known in the art, such as those manufactured by the Revere Corporation, known as superior precision series USP 500 load cells single bridge with compression load adapter. An alternative device is to use gauging means such as those being made by IDC, 30 Merz Blvd., Akron, Ohio. Secured to the uppermost end portion of carriage 62 is an upper bracket 84 (FIGS. 2 and 3) and a lower bracket, not shown, which have secured thereto flex plates which are identical in construction and therefore only one will be described in detail.

Bracket 84 has a pair of vertically disposed flex plates 86 and 87 extending laterally therefrom which are secured to one leg of an L-shaped bracket 89, thereby permitting limited flexibility of the L-shaped bracket 89 toward and away from the axial center line of rim flanges 26 and 40. Bracket 89 secures one end of a horizontally disposed flex plate 90 which lies in a plane normal to that of flex plates 86 and 87 having its other end secured to a support member 92 which journals one end of a vertically extending shaft 93 upon which is mounted a load wheel 94. The lower end portion of shaft 93 is supported by a support member 95 which through flex plates 96, 97 and 98 is connected to a bracket identical to bracket 84 which bracket is secured to carriage 62 (FIG. 1). The flex plates 90 and 96 are adapted to register axial loading on load wheel 94 whereas flex plates 86, 87 and 97, 98 register the radial loading on such load wheel. Bracket 89 as shown in FIGS. 2 and 3 has a horizontally extending brace 100 which supports a downwardly extending load-sensing device 101 which is adapted to engage the one end portion of support member 92 to measure axial stresses imposed thereon from load wheel 94 to generate a signal proportional to the amount of deflection of flex plates 90 and 96, which signal is adapted to be recorded by moving a needle on a chart for comparison tests or to register on a preset gauge, as acceptable or unacceptable, such gauges being commercially available as manufactured by IDC, 30 Merz Blvd., Akron, Ohio.

To facilitate the loading and unloading of tires on the tire testing apparatus, a table 105 is secured to the intermediate portions of the four columns 12, 13, 14 and 15. Table 105 has a plurality of cup-shaped retaining members 108 with an opening at the upper end portion to expose ball bearings 109 which are suitably retained in such retaining members 108. The uppermost edge portions of the ball bearings 109 permit ease of transfer of a tire carcass to and from the testing machine. Table 105 has an annular opening 110 (FIG. 4) located centrally thereof to permit the rim flange 40 to move upwardly therethrough to pick up a tire for positioning such tire into mounting relationship with rim flange 26 for testing purposes.

To unload a tire from the rim flange 26, a plurality of pneumatic cylinders 111 are attached to suitable braces on the upper end portion of the frame of the testing apparatus. Such cylinders 111 have downwardly extending piston rods 112 which have secured to their lower end portion bead breaking plates 113. In the operation of such bead breaking device, the pressurization of the head end of pneumatic cylinders 111 operates to move the piston rods and the bead breaking plates 113 downwardly to engage the sidewall of the tire and forcibly remove the tire from the rim flange 26, having previously moved rim flange 40 downwardly beneath table 105.

In the operation of the apparatus described, a tire T is fed onto table 105 and positioned over the lower rim flange 40. Motor 18 is energized which rotates rim flange 26 at a slow speed simultaneously therewith. Solenoid operated valve SV-5 (FIGS. 4 and 5) is energized to connect the pressurized air from the source S via conduit 120 through an alemite spray tank 121 through conduit 122 to lubricate the rim flange 26 and via conduit 123 to lubricate rim flange 40. Solenoid operated valve SV-1 is then energized to pressurize the head end of pneumatic cylinders 42 which move the piston rod 49 upwardly along with rim flange 40 which rim flange 40 rises through the opening 110 of table 105 to pick up a tire for movement towards rim flange 26. At the same time solenoid operated valve SV-4 is energized to the position shown in FIG. 4 to connect pressurized conduit 120 to conduits 124 and 125 to pressurize the rod end of pneumatic cylinders 111 which retracts the bead breaking plate 113 upwardly to the position shown in FIG. 4. When the piston rod 49 of pneumatic cylinder 42 reaches the end of its upward stroke the space between the inside faces of the two flanges 26 and 40 is approximately ¼ of an inch. Such upward movement of rod 49 (FIG. 5) actuates limit switch LS-1 which energizes solenoid operated valve SV-2 which connects pressurized conduit 126 to the head end of pneumatic cylinder 29 which move the piston rod 31 downwardly wedging cam 33 against the respective latches 35 such that the projections 38 are adapted to engage the annular shoulder 39 on the lower rim flange 40.

The pressurized fluid in pneumatic tire T exerts a force on rim flange 40 which is greater than the force exerted by the respective pneumatic cylinders 42 thereby moving rim flange 40 downwardly to seat the annular shoulder 39 on the projections 38 of latches 35 thereby locking the respective flanges 36 and 40 in position relative to the inflated tire T. Movement of the piston rod 31 in a downward direction actuates limit switch LS-2 which operates solenoid operated valve SV-3 which connects pressurized conduit 127 with conduit 128 which thereby supplied pressurized air to the tire and inflates such tire to the desired pressure as, for example, 30 p.s.i.

Pressure switch PS-1 (FIG. 5) which is set at 29 p.s.i. in view of the above example energizes motor 18 which rotates the tire at a low speed and at the same time energizes motor 60 which causes the rotation of lead screw 69 to cause high speed rotation of such lead screw moving the load wheel 94 to advance such load wheel 94 until such load is within predetermined limits of force of a preset value at which time limit switch LS-3 is operated to stop the rotation of motor 60, after which suitable timer switches may be actuated to provide re-energization of motor 60 to permit the load wheel to adjust to the preset load as set by suitable gauges and indicator dials, after which motor 60 is de-energized and electromagnetic brake 77 is energized to lock the lead screw 69 in its preset position to maintain the preset load on the tire T. If desired, motor 17 may be energized to warm up the tire at a high speed; however, should this step be eliminated, motor 18 rotates the tire in a first direction for two revolutions and then through a suitable timer or photoelectric cell means rotates tire T in a second direction which is opposite to such first direction. A suitable pick-up circuit is operatively connected to the respective load cells 81, 80 and 101 to pick up the stresses which are imparted to the respective flex plates and sends a signal to a suitable recorder to provide a visual record of the variation in the stresses in such tire or to register a signal on suitable gauges indicating acceptable or unacceptable tires. Upon completion of the test the load wheel 94 is retracted by the high speed rotation of lead screw 69 until limit switch LS–4 is operated which stops the rotation of motor 60 and motor 18. Limit switch LS–4 also de-energizes solenoid operated valve SV–3 which connects conduit 128 to exhaust, which exhausts the air out of the pneumatic tire under test. As soon as the air in the tire reduces to such a value that the force due to the air pressure in pneumatic cylinders 42 is of a greater value than the force on lower flange 40 from the tire T, cylinder 42 is raised and operates limit switch LS–1 which energizes solenoid operated valve SV–2. Solenoid operated valve SV–2 connects the rod end portion of pneumatic cylinder 29 to pressure conduit 126 which retracts the piston 31, rod 32 and cam 33, which cam 33 engages the projections 37 to pivot the respective latches 35 inwardly for retraction into the rim flange 26 to facilitate the unloading of a tire held on such rim flanges. Solenoid operated valve SV–1 is also de-energized which retracts the lower rim flange 40 dropping the tire onto the conveyor. In the event the tire remains seated on the upper rim flange 26, the operation of solenoid operated valve SV–4 connects pressurized conduit 124 to conduit 130 which is connected to the head end portion of cylinders 111 which moves such piston rods 112 downwardly forcing the bead breaking plates 113 against the sidewalls of a tire to force such tire downwardly away from the rim flange 26 onto the table 105 for movement away therefrom.

It should be understood, of course, that the foregoing disclosure relates to only a preferred embodiment of the invention and that numerous modifications or alterations may be made therein without departing from the spirit and the scope of the invention.

We claim:

1. An apparatus for measuring tire uniformity comprising support means having laterally spaced rim flanges movable axially toward and away from each other for rotatably supporting an inflatable tire therebetween; means for rotating said rim flanges and a tire supported therebetween; a load wheel means movable towards and away from said rim flanges; the axes of said rim flanges and said load wheel lying in a parallel vertical relationship; means for moving said load wheel toward said flanges to provide a preselected load force on said tire as said flanges and tire rotate; and load measuring means operatively connected to said load wheel means for registering radial and axial forces due to irregularities in the tire construction.

2. An apparatus for measuring tire uniformity comprising support means having laterally spaced rim flanges movable axially toward and away from each other for rotatably supporting an inflatable tire therebetween; means for rotating said rim flanges and a tire supported therebetween; a load wheel means movable towards and away from said rim flanges; means for moving said load wheel toward said flanges to provide a preselected load force on said tire as said flanges and tire rotate; load measuring means operatively connected to said load wheel means for registering radial and axial forces due to irregularities in the tire construction, said load measuring means being mounted on a support frame, motive drive means on said support means operatively connected to said support frame for moving said support frame and said load wheel toward said flanges to impose a preselected force on said tires, wherein said support means mounts said flanges with axes extending in a vertical direction facilitating the conveyance and discharge of tires to such measuring apparatus.

3. An apparatus as defined in claim 2 wherein said support frame has a pair of brackets and a pair of journal support members, each of said brackets having a pair of spaced flex plates lying in vertical planes connecting each of said brackets to said support frame; each of said brackets connected to one end of a horizontally disposed flex plate; the other end of said horizontally disposed flex plate is connected to said journal support members respectively that supports the shaft that carries said load wheel; a first load cell mounted on one of said brackets and being operatively connected to the shaft of said load wheel to detect axial forces thereon; a pair of load cells mounted on said support frame and being operatively connected to said journal support member for detecting radial force variations from said vertically disposed flex plates; and said load measuring means being operatively connected to said load cells for registering axial and radial forces therefrom.

4. An apparatus as set forth in claim 3 wherein said support means supports upper and lower spaced rim flanges having their axes lying along a vertical line; said upper rim flange having a plurality of depending latches, said lower rim flange movable toward and away from said upper flange, said lower flange having a plurality of recesses, said upper flange having power operated means on said frame operatively connected to said latches for moving latches into said recesses to limit axial movement of said lower rim flange away from said upper rim flange.

5. An apparatus as set forth in claim 4 wherein said support means supports lubrication spray means operable to spray lubricant onto said flanges to facilitate sealing of a tire thereon and to facilitate the removing of a tire therefrom in timed relationship to the movement of said lower rim flange toward said upper flange, and ejection means operable in timed relationship with said lower flange to remove a tire held by said upper flange.

6. An apparatus for measuring tire uniformity comprising, a support means; said support means rotatably supporting an upper rim bange and a lower rim flange having their axes extending in a vertical direction; pneumatic cylinder means for moving said lower flange toward said upper flange; drive means operatively connected to said flanges for selectively rotating said flanges at a slow speed or at a high speed; said lower flange having a recessed shoulder therein; said upper flange having a bore extending vertically therethrough along its central vertical axis; a plurality of depending lugs pivotally mounted closely adjacent the opening of said bore on said upper flange; said lugs movable into engagement with said shoulder upon movement of said lower rim flange toward upper flange; cam means mounted on said upper rim flange for reciprocable movement along said bore for camming engagement with said lugs for moving said lugs into engagement with said shoulder for locking engagement therewith; means operatively connected to said cam means selectively reciprocating said cam means; means for introducing pressurized air to said pneumatic cylinder means and to openings in said lower flange to inflate a tire supported between said flanges and to move said lower flange downwardly relative to said upper flange; a load wheel assembly movable in a direction normal to said vertical axis toward and away from said flanges into and out of engagement with a tire held by said flanges; means for moving said load wheel assembly in said normal direction to impose a predetermined load on such tire within limits; and load measuring means operatively connected to said load wheel assembly for registering radial and axial forces due to irregularities in the tire construction.

7. An apparatus as set forth in claim 6 wherein said load wheel assembly includes a carriage and load wheel, said carriage having means for securing said carriage from movement relative to said flanges to provide a preselected force within limits on said tire held between said flanges in cooperation with said drive means rotating said flanges and a tire held therebetween.

8. An apparatus as set forth in claim 7 wherein said load wheel assembly comprises a load wheel; a support frame having a pair of spaced brackets; each bracket having flex plates connecting said support frame to said bracket; said flex plates lying in a vertical plane, each of said brackets having horizontally disposed flex plates operatively connected to bearing supports, said bearing supports rotatably supporting said load wheel, first load cell means mounted on said support frame operatively connected to said bearing supports for registering radial forces on said load wheel; second load cell means mounted on said brackets and operatively connected to one of said bearing supports for registering axial forces on said load wheel, and recording means operatively connected to said load cells for registering said axial and radial forces.

9. An apparatus as set forth in claim 8 wherein drive means are connected to said support frame for moving said support frame and load wheel toward and away from said flanges and a tire mounted thereon; control means operatively connected to said drive means and said load cells for imparting a preselected load force on said tire held by said flanges; and brake means operative to lock said drive means to provide said preselected load force on said tire.

10. An apparatus for measuring tire uniformity comprising support means, said support means having rim flanges for rotatably supporting an inflatable tire; means for rotating said rim flanges and a tire supported therebetween; means communicating with the chamber defined by said flanges and a tire held therebetween for supplying pressurized air to such tire; a load wheel means movable towards and away from said rim flanges; load measuring means operatively connected to said load wheel means for providing an electrical signal in response to the variations in radial stresses imposed thereon due to irregularities in the tire construction, said load measuring means being mounted on a support frame, motive drive means on said support means operatively connected to said support frame for moving said support frame and said load wheel means toward said flanges to impose a preselected load force on said tires within preselected limits, and energizable brake means operatively connected to said motive means to locate the axis of said load wheel means a predetermined distance from the axis of rotation of said flanges.

11. An apparatus as set forth in claim 10 wherein said support means mounts said flanges with axes extending in a vertical direction facilitating the conveyance and discharge of tires to such measuring apparatus.

12. An apparatus for measuring tire uniformity comprising support means having an upper and lower spaced rim flanges with their axes lying along a vertical line; said upper rim flange having a plurality of depending latches, one of said rim flanges movable toward and away from the other of said flanges, said lower flange having a plurality of recesses, said upper flange having power operated means on said frame operatively connected to said latches for moving said latches into said recesses to limit axial movement of said lower rim flange away from said upper rim flange, means communicating with the chamber defined by said flanges and a tire held therebetween for supplying pressurized air to such tire; a carriage movable towards and away from said rim flanges; said carriage having a load wheel thereon; means for moving said carriage and load wheel toward said flanges to provide a preselected approximate load force on said tire as said flanges and tire rotate; brake means energizable upon said preselected force being reached to secure said carriage from movement, a pair of spaced flex plates lying in vertical planes having one end connected to said carriage, the other end of said flex plates connected to journal means for rotatably supporting said load wheel, a pair of load cells mounted on said carriage and being operatively connected to said journal means for detecting radial force from said vertically disposed flex plates; and load measuring means being operatively connected to said load cells for providing an electrical signal in response to the variations in radial stresses imposed thereon, due to irregularities in the tire construction.

13. An apparatus for measuring tire uniformity comprising support means, said support means having rim flanges for rotatably supporting an inflatable tire; means for rotating said rim flanges and a tire supported therebetween; means communicating with the chamber defined by said flanges and a tire held therebetween for supplying pressurized air to such tire; a load wheel means movable towards and away from said rim flanges; moving means operative upon actuation for moving said load wheel toward said flanges to provide a preselected load force within preselected limits on said tire for locating said wheel a fixed distance from the axis of rotation of said rim flanges as said flanges and tire rotate; means for deactuating and locking said moving means; and load measuring means operatively connected to said load wheel means for providing an electrical signal in response to the variations in lateral stresses imposed thereon due to irregularities in the tire construction as said tire is rotated under said preselected load force.

References Cited
UNITED STATES PATENTS

| | | | |
|---|---|---|---|
| 2,251,803 | 8/1941 | Pummill | 33—203.13 |
| 2,695,520 | 11/1954 | Karsai | 73—146 |
| 3,208,154 | 9/1965 | Pancoast | 33—203.13 |
| 3,375,714 | 4/1968 | Bottasso | 73—146 |

FOREIGN PATENTS

| | | | |
|---|---|---|---|
| 895,514 | 5/1962 | Great Britain | 33—203.13 |

OTHER REFERENCES

Bajer, "The Control of Tire Non-uniformity and a Passenger Car Manufacturer's Point of View," Society of Automotive Engineers, 15 pages, 1963.

LOUIS R. PRINCE, Primary Examiner